US010625122B2

(12) United States Patent
Hurwitz et al.

(10) Patent No.: US 10,625,122 B2
(45) Date of Patent: Apr. 21, 2020

(54) ENCLOSURE FOR A BOWLING BALL

(71) Applicant: Magnum Shielding Corporation, Pittsford, NY (US)

(72) Inventors: Cameron F. Hurwitz, Rochester, NY (US); Scott L. Hurwitz, Rochester, NY (US)

(73) Assignee: Magnum Shielding Corporation, Pittsford, NY (US)

( * ) Notice: Subject to any disclaimer, the term of this patent is extended or adjusted under 35 U.S.C. 154(b) by 0 days.

(21) Appl. No.: 16/271,301

(22) Filed: Feb. 8, 2019

(65) Prior Publication Data

US 2019/0314686 A1    Oct. 17, 2019

Related U.S. Application Data

(63) Continuation-in-part of application No. 15/952,967, filed on Apr. 13, 2018, now Pat. No. 10,463,922.

(51) Int. Cl.

| A63B 47/00 | (2006.01) |
| B32B 27/36 | (2006.01) |
| B32B 27/32 | (2006.01) |
| B32B 27/08 | (2006.01) |
| B65D 81/38 | (2006.01) |

(52) U.S. Cl.
CPC ............ *A63B 47/007* (2013.01); *B32B 27/08* (2013.01); *B32B 27/32* (2013.01); *B32B 27/36* (2013.01); *B65D 81/3897* (2013.01); *A63B 2209/10* (2013.01); *B32B 2307/304* (2013.01); *B32B 2307/7242* (2013.01); *B32B 2439/40* (2013.01)

(58) Field of Classification Search
CPC ........... A45C 3/00; A45C 13/02; A63B 47/00; A63B 47/005; A63B 47/007; A63B 2209/10; B32B 3/266; B32B 27/08; B32B 27/32; B32B 27/36; B32B 2307/304; B32B 2307/7242; B32B 2439/40; B65D 81/38; B65D 81/3897
USPC .............................. 206/315.91; 190/100–110
See application file for complete search history.

(56) References Cited

U.S. PATENT DOCUMENTS

| 1,717,587 A * | 6/1929 | Shipley ..................... A45C 3/00 |
| | | 206/315.91 |
| 1,802,682 A * | 4/1931 | Stupecky ............. A63B 47/007 |
| | | 206/315.91 |
| 2,617,012 A * | 11/1952 | Westley ............... A63B 47/007 |
| | | 219/385 |

(Continued)

*Primary Examiner* — Bryon P Gehman
(74) *Attorney, Agent, or Firm* — Brian B. Shaw, Esq.; Harter Secrest & Emery LLP

(57) ABSTRACT

A method and a bowling ball enclosure are provided for encasing and reducing temperature fluctuations of and within a bowling ball. The bowling ball enclosure includes a flexible inner vapor barrier layer and a flexible outer layer that are made of a polymer material, the inner layer forming an interior region that receives the bowling ball. The bowling ball enclosure also includes a bottom portion and a top portion, wherein the top portion is positionable from a first position to a second position to encapsulate the bowling ball. In the first position, the top portion being in an open position to receive the bowling ball into the interior region. In the second position, the top portion being in a closed position to encapsulate the bowling bowl. A thermal resistor can be located between the bowling ball enclosure and a support surface.

20 Claims, 9 Drawing Sheets

(56) References Cited

U.S. PATENT DOCUMENTS

| | | | | |
|---|---|---|---|---|
| 3,091,681 | A | * | 5/1963 | Mayer .................. A63B 47/005 219/523 |
| 3,225,806 | A | * | 12/1965 | Pollak ...................... A45C 3/00 206/315.91 |
| 5,615,769 | A | * | 4/1997 | Stephenson .......... A63B 47/005 206/315.9 |
| 7,900,757 | B2 | * | 3/2011 | Sisitsky ................. A45C 13/02 150/113 |
| 10,029,842 | B2 | * | 7/2018 | Seiders .................. A45C 13/30 |
| 10,328,962 | B2 | * | 6/2019 | Collins .................... B60D 1/58 |
| 2019/0071238 | A1 | * | 3/2019 | Seiders ................... A45C 3/00 |

* cited by examiner

ENCLOSURE FOR A BOWLING BALL

BACKGROUND OF THE INVENTION

Field of the Invention

The present disclosure relates to an apparatus and method for encapsulating a bowling ball to reduce temperature fluctuations of a bowling ball and temperature differentials within a bowling ball so as to reduce induced coverstock cracking and core and layer separation, and to reduce accelerated resin coverstock aging through heat induced leaching of the chemicals added to resins to impart flexibility and to reduce resin coverstock aging through the evaporative aging (drying) of the bowling ball coverstock so as to reduce coverstock cracking and performance degradation.

Description of Related Art

A bowling ball is typically made up of multiple layers, such as a core, a filler, and a coverstock, wherein each layer of material has a different thickness and composition. Heavier bowling balls may include additional layers of greater density material or more layers of a particular material. As each layer of material has a particular coefficient of thermal expansion, each layer will expand and contract at different corresponding rates, which upon exposure to a substantial change in ambient temperature may play a role in the occasional cracking of the bowling ball. For example, depending upon the season (summer or winter), a bowling ball may experience a temperature change of 20° F.-50° F. or greater, such as when transitioning from outdoors to "room temperature" or vice versa. Due to thermal expansion or contraction, the materials of an unprotected bowling ball may not be able to tolerate the sudden disparate changes in temperature, such as between the poles of the bowling ball or between the core and the outside of the bowling ball, thus resulting in cracking of the bowling ball.

If a bowling ball is placed on a concrete floor such as in a basement or garage, there is an ambient temperature difference directly contiguous to both the bottom and top polar regions of the bowling ball relative to its orientation resting on the floor. At times, there may be an ambient temperature differential of 6° F. or greater between the top and bottom polar regions of the bowling ball. After a period of time, this temperature gradient is directly transferred to the polar regions of the bowling ball, wherein the resulting temperature differential may cause the bowling ball to crack.

Also, as the coverstocks may now be formed of a wide range of reactive resins, the bowling balls can have a tendency to dry through the evaporation of plasticizers, which can lead to degradation in performance of the bowling ball and may result in cracking.

Therefore, a need exists for a system that encapsulates a bowling ball to provide thermal insulation, thereby reducing temperature fluctuations and differentials and retaining desired softening agent levels, while extending the life and factory-new performance characteristics of the bowling ball.

BRIEF SUMMARY OF THE INVENTION

It has been discovered that exposure of a bowling ball to a thermal reservoir (which can be hotter or colder than ambient air temperature) can impart a thermal gradient in the bowling ball extending along a diameter of the bowling ball, such as a vertical diameter, (herein referred to as a polar gradient). That is, thermal strata extending generally perpendicular to a diameter of the bowling ball are formed as opposed to a gradient imparted by exposure of the bowling ball to a uniform ambient environment wherein equal radii generally have equal temperature, and the temperature varies along the radius (herein referred to a radial gradient). It is believed the temperature differential affects each layer of material in the bowling ball and especially the outer layer coverstock creating tension from the coefficient of thermal expansion variability between the poles.

The present disclosure addresses a discovered intolerance of a bowling ball to thermal shock and thermal gradients (and particularly polar gradients), wherein the intolerance can be exacerbated when the outer resin cover, or coverstock, has experienced loss of volatiles and plasticizers and thus a shrinkage of the coverstock which in turn can increase internal tension in the coverstock due to the evaporative aging process. This tendency of the coverstock to experience shrinkage and increased internal tension is exacerbated due to the additives used in current polyurethane resin formulations of reactive resin bowling balls which create porosity from micro air pockets throughout the coverstock thereby lowering its density and structural integrity, wherein the micro air pockets enhance the evaporation of volatiles from the coverstock and hence the drying process of the coverstock inherent to increased surface areas.

That is, oils, resin vapors, and plasticizers (volatiles) now used in the manufacture of bowling balls to produce or promote plasticity and flexibility and to reduce brittleness can both evaporate and seep out of the bowling ball resin coverstock, and it has been found that temperature fluctuations of the bowling ball can promote the evaporation and seepage. The present system provides for retaining a relatively high concentration of resin chemicals, plasticizer, and resin vapors (volatiles) in the environment of the retained bowling ball so as to reduce the evaporation rate of the resin chemicals, plasticizers, and resin volatiles ("volatiles") from the bowling ball. It is believed the preservation of such resin chemicals, plasticizers, and resin volatiles within the coverstock of the bowling ball will increase the useful life and performance characteristics of the bowling ball. That is, it is believed the creation and maintenance of a relatively high vapor pressure of each of these volatiles within the enclosure reduces the loss of the volatiles from the bowling ball, thereby contributing to an increase in the useful life and performance characteristics of the bowling ball.

It has also been discovered that independent of the existence of a polar gradient within the bowling ball, as the coverstocks now formed of reactive resins, the bowling balls can have a tendency to dry or age through the evaporation of volatile molecules or plasticizers and the bleeding as well as the leaching out of plasticizers when subjected to hot seasonal temperatures, which can lead to degradation in the factory new performance characteristics of the bowling ball affecting the engagement footprint of the contact area of the surface area of the bowling ball with the bowling lane due to an increase in hardness of the bowling ball, such as an increase in the Shore D durometer, that may also result in cracking.

It is also believed the coverstock of the bowling ball may be most susceptible to tension induced cracking from temperature differentials between opposing poles of the bowling ball (polar gradient), especially if the bowling ball has materially evaporatively aged. That is, it is believed the coverstock may be susceptible to cracking from a polar gradient above a predetermined level, especially if the coverstock is evaporatively aged. It has also been discovered that hardness of the bowling ball can be used as an indicator of evaporative aging of the bowling ball. Generally, as the bowling ball dries out and evaporatively ages, the hardness (durometer) of the bowling ball increases. Current regulations require the bowling ball have a hardness of at least 72 Shore D at room temperature 68° F. to 72° F. For example, new bowling balls may have a durometer of between 73 and 75 Shore D.

However, as the coverstocks, and bowling ball, evaporatively age, the hardness increases. Thus, an evaporative aging of the bowling ball can be assessed by the hardness of the bowling ball changing by 1.5% or more, or by 2% or by 4% or more. That is, the hardness of the bowling ball can be used as a surrogate parameter for assessing an evaporative aging of the bowling ball.

The present system addresses both types of thermal gradients in a bowling ball. The system reduces the extent of a polar gradient by resisting the transfer of energy into or out of the ball as the energy flows within the bowling ball to equalize or reduce the polar gradient. The present system also reduces the thermal shock from an ambient environment by slowing the radial transfer of energy into or out of the bowling ball.

Thus, the present system encapsulates a bowling ball to provide thermal insulation, thereby reducing radial temperature fluctuations and temperature differentials or gradients between poles of the bowling ball, wherein the encapsulated bowling ball retains desired coverstock moisture (volatiles) levels (or at least reducing evaporative aging), thereby extending the life and performance attributes of the bowling ball. The thermal encapsulation of the bowling ball also protects the bowling ball against degradation from secreting out resin oils and plasticizers when being subjected to high seasonal temperatures.

The present system also slows the evaporative aging of the bowling ball by encapsulating the bowling ball with a vapor barrier, such as a non-breathable Mylar® film barrier to minimize the evaporation of volatiles such as resin solvents, softeners and plasticizers. It is believed the retention of the volatiles and plasticizers in a bowling ball will prolong the as manufactured properties, such as durometer of the reactive resin coverstock which affects the surface area of the ball contacting the lane surface and reduce cracking.

It is also believed that there is existing tension within the outer coverstock itself created during the curing in the manufacturing process which can be exacerbated or amplified from temperature differential.

Thus, in one configuration, the present system encompasses the use of a Mylar® film as a tear resistant, vapor barrier for the protection of a bowling ball, wherein the film not only keeps sunlight out, along with associated radiative heating, but reduces volatiles, such as bowling ball resins and oils from evaporating and leaching out by retaining a relatively high vapor pressure of the resins and oils exposed to the bowling ball. In addition, it is contemplated the Mylar® film can provide a strong marketing advantage by allowing ready colors and printing, hence customization of the film and enclosure to a team, a corporation, league, sponsor or individual.

The present system also inhibits thermal shock to a retained bowling ball by substantially encompassing the bowling ball within a layer of insulation. In one configuration, such as when storing the bowling ball in an ambient environment that includes a thermal reservoir that has an at least 7°-10° F. temperature differential to the ambient air temperature, the present system can employ a separate thermal resistor, such as a perforated circulating ring or insulation disk, beneath the bowling ball in conjunction with the enclosure. In one configuration, the circulating ring reduces the temperature differential between the ambient air temperature and the thermal reservoir from a 10° F. differential to a temperature differential between the two polar regions of the encased bowling ball within the enclosure to a 3.5° F. differential. The reduced temperature differential exposed to the bowling ball in conjunction with the insulation of the present enclosure allows the temperature of the bowling ball to sufficiently uniformly rise or fall without creating a polar temperature gradient believed to be sufficient to crack the bowling ball which has not been desiccated.

The present disclosure provides a bowling ball enclosure assembly configured to encase a bowling ball and reduce evaporative aging of the bowling ball, the bowling ball enclosure assembly having a flexible inner vapor barrier layer forming an open enclosure sized to receive the bowling ball, the open enclosure having a concave bottom to support the bowling ball; a flexible outer layer encompassing the inner vapor barrier layer; a flexible insulation layer intermediate the inner vapor barrier layer and the flexible outer layer; a releasable fastener connected to the flexible inner vapor barrier and the flexible outer layer, the releasable fastener moveable between (i) an open position sized to permit passage of the bowling ball into the enclosure and (ii) a closed position enclosing the bowling ball within the enclosure; wherein the flexible insulation layer encompasses at least 75% of the bowling ball in the closed position of the releasable fastener.

In one configuration, the bowling ball enclosure can further include a vent port extending through the flexible inner vapor barrier layer, wherein the flexible insulation layer, the flexible outer layer, and the vent port are configured to permit the passage of air into and out of the enclosure.

A further configuration is disclosed wherein a bowling ball kit includes a box having an open configuration and a closed configuration, wherein the box in the closed configuration defines an interior cubic volume of less than 730 in3; a bowling ball having a diameter between 8.500 inches (21.59 cm) to 8.595 inches (21.83 cm); and an enclosure enclosing the bowling ball, the enclosure having a flexible inner vapor layer, a flexible outer layer and a flexible insulation layer intermediate the flexible inner vapor barrier layer and the flexible outer layer, wherein the enclosure is configured to enclose the bowling ball and be enclosed within the box in the closed configuration.

A method is provided for utilizing a bowling ball enclosure to encase and reduce temperature fluctuations and plasticizer evaporation of a bowling ball, wherein the method includes providing the bowling ball enclosure, the bowling ball enclosure having a flexible inner vapor barrier layer and a flexible outer layer that are made of a polymer material, the flexible inner vapor barrier layer forming an interior region that receives the bowling ball; a bottom portion and a top portion, the bottom portion having a concave surface for receiving a portion of the bowling ball and the top portion being positionable from a first position to a second position, (i) in the first position, the top portion being open to receive the bowling ball into the interior region; and (ii) in the second position, the top portion being closed to encapsulate the bowling bowl; a flexible insulation layer intermediate the flexible inner vapor barrier layer and the flexible outer layer, the flexible insulation layer having an upper configuration to permit the inner vapor barrier layer to contact the flexible outer layer in the second position of the top portion; and at least one releasable fastener for releasably retaining the top portion in the second position. It is further contemplated that one configuration can include a vent port extending through the flexible inner vapor barrier layer, the flexible insulation layer and the flexible outer layer.

BRIEF DESCRIPTION OF THE SEVERAL VIEWS OF THE DRAWING(S)

The accompanying drawings, which are included to provide further understanding of the present disclosure and are incorporated in and constitute a part of this specification, illustrate aspects of the disclosure and together with the description serve to explain the principles of the disclosure. In the drawings:

FIG. 1013 is a side elevational view of the blank of FIG. 10A;

DETAILED DESCRIPTION OF THE INVENTION

Figure 1:
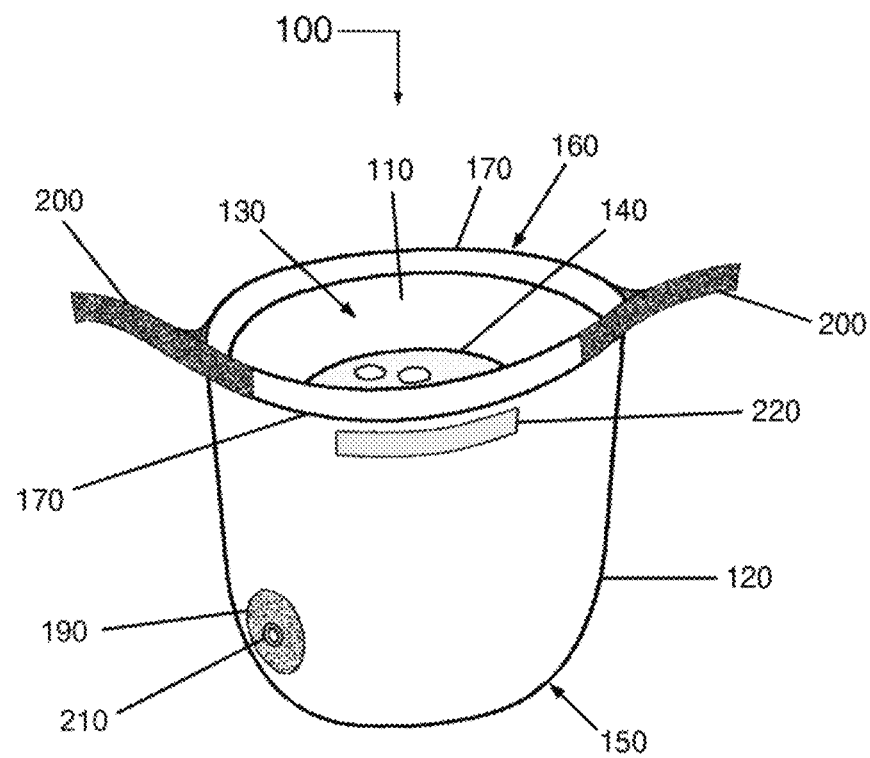
FIG. 1 is a perspective view of a bowling ball enclosure in a first position with a bowling ball within the enclosure.

The detailed description set forth below is intended as a description of various configurations of the present disclosure and is not intended to represent the only configurations in which the present disclosure may be practiced. It will be apparent, however, to those of ordinary skill in the art that the present disclosure is not limited to the specific details set forth herein and may be practiced without these specific details.

Embodiments of the present disclosure provide an apparatus and a method of providing an insulating body for encompassing at least one bowling ball. The present disclosure addresses the problems associated with temperature variations on bowling balls, which can cause resin chemicals to seep out of the bowling ball material and can cause material failures. The present disclosure also provides for retaining a relatively high concentration of resin chemicals, plasticizer, and resin vapors in the environment of the retained bowling ball so as to reduce the evaporation rate of the resin chemicals, plasticizers, and resins from the bowling ball—thereby reducing an evaporative aging of the bowling ball.

It has been found that a stratified temperature gradient between opposing poles (poles) of the bowling ball can impart a cracking of the bowling ball. Further, it has been discovered that depending on the amount of evaporative aging of the bowling ball, a temperature gradient of 6° F. or more between the poles may result in a cracking of the bowling ball. Thus, the present system is configured to provide the material of the bowling ball sufficient time for energy transfer (thermal transfer or temperature equalization) within the bowling ball without exceeding a cracking inducing temperature differential between the poles of the bowling ball. The present system provides sufficient time for the heat to transfer through the material of the bowling ball to maintain a safe temperature differential between opposing poles. That is, the insulation sufficiently inhibits the introduction (or withdrawal) of energy (as temperature) into (and out of) the bowling ball so that any preferential/asymmetric heating (or cooling) of the bowling ball sufficiently equilibrates to maintain a temperature differential (gradient) between the poles within acceptable limits—such as no more than a 5° F. temperature gradient. That is, the bowling ball retained within the present bowling ball enclosure can sufficiently temperature stabilize such that the polar temperature gradient remains small enough to avoid imparting cracking of the bowling ball.

The present system reduces the formation of polar and radial temperature gradients in the bowling ball that could otherwise crack the bowling ball, by sufficiently inhibiting the amount of energy that is transferred into/out of the bowling ball so that thermal transfer within the bowling ball is sufficient to limit the polar and radial temperature gradients to within acceptable (non-cracking) gradients.

It has been further discovered that the temperature gradient that the bowling ball can withstand without cracking depends, in part, on the evaporative aging, the amount of volatiles that have left the bowling ball, for which a surrogate measure is the change of hardness of the bowling ball. As set forth below, the present bowling ball enclosure slows the evaporative aging of the bowling ball. It is also believed that a hardness of the bowling ball provides a surrogate parameter for measuring an evaporative aging of the bowling ball.

As set forth above, the amount of evaporative aging (or hardness) of the bowling ball can contribute to the inability of the bowling ball to withstand polar temperature gradients without cracking. It is further believed that slowing the evaporative aging of the bowling ball increases the polar temperature gradients that can be withstood by the bowling ball without cracking.

FIGS. 1-6 illustrate a representative bowling ball enclosure 100. The bowling ball enclosure 100 may include a flexible inner vapor barrier layer (or inner layer) 110 and a flexible outer layer 120. It is contemplated both the flexible inner layer 110 and the flexible outer layer can each be a vapor barrier layer, however, it is understood that only the inner layer needs to be a vapor barrier layer.

The flexible inner vapor barrier layer 110 and the flexible outer layer 120 may be made of a polymer material. The polymer material can be selected to function as a vapor barrier which functions as a vapor diffusion retarder, a solar barrier, as well as provide strength for retaining a bowling ball 140. In one configuration, the polymer material may be a polyester and in certain configurations a polyethylene terephthalate (PET) or a polyethylene, and in further configurations a polyester, biaxially-oriented polyethylene terephthalate (which performs as a vapor barrier), though it is recognized the material can be any other material suitable for the intended purpose and understood by one of ordinary skill in the art. In one configuration, the flexible inner vapor barrier layer 110 and the flexible outer layer 120 may be polyester films commercially available under the mark MYLAR® of Dupont Teijin Films U.S. Alternatively, it is contemplated at least one of the flexible inner vapor barrier layer 110 and the flexible outer layer 120 may be formed of a 2 to 6 mil (thousandths of an inch) thick polyethylene film. In one configuration, each of the flexible inner vapor barrier layer and the flexible outer layer are formed of a 2 mil MYLAR® film.

Further, the flexible inner vapor barrier layer 110 and the flexible outer layer 120 are pliant, such that they conform to the shape of the bowling ball 140 in response to the weight of the bowling ball. That is, flexible inner vapor barrier layer 110 and the flexible outer layer 120 easily bend and are typically as pliable as commercially available aluminum foil. By flexible or conforming, it is intended to encompass bendable or pliant, such as able to be easily altered or change shape in response to the weight of the bowling ball 140.

The flexible inner vapor barrier layer 110 of the bowling ball enclosure 100 may form an interior region 130 that receives the bowling ball 140. The flexible inner vapor barrier layer 110 and the flexible outer layer 120 may be monolithic that resists tearing and assists in retaining the bowling ball 140 in the bowling ball enclosure 100. That is, each the flexible inner vapor barrier layer 110 and the flexible outer layer 120 may be formed of a single integral piece, blank, of material. It is understood the blanks may include notches or cuts for forming into the desired shape. The flexible inner vapor barrier layer 110 and the flexible outer layer 120 of the bowling ball enclosure 100 may also be constructed to be sufficient to prevent tearing of the bowling ball enclosure 100 due to the weight of the bowling ball 140. In one configuration, the bowling ball weighs between approximately 6 pounds and 16 pounds.

Figure 7A:
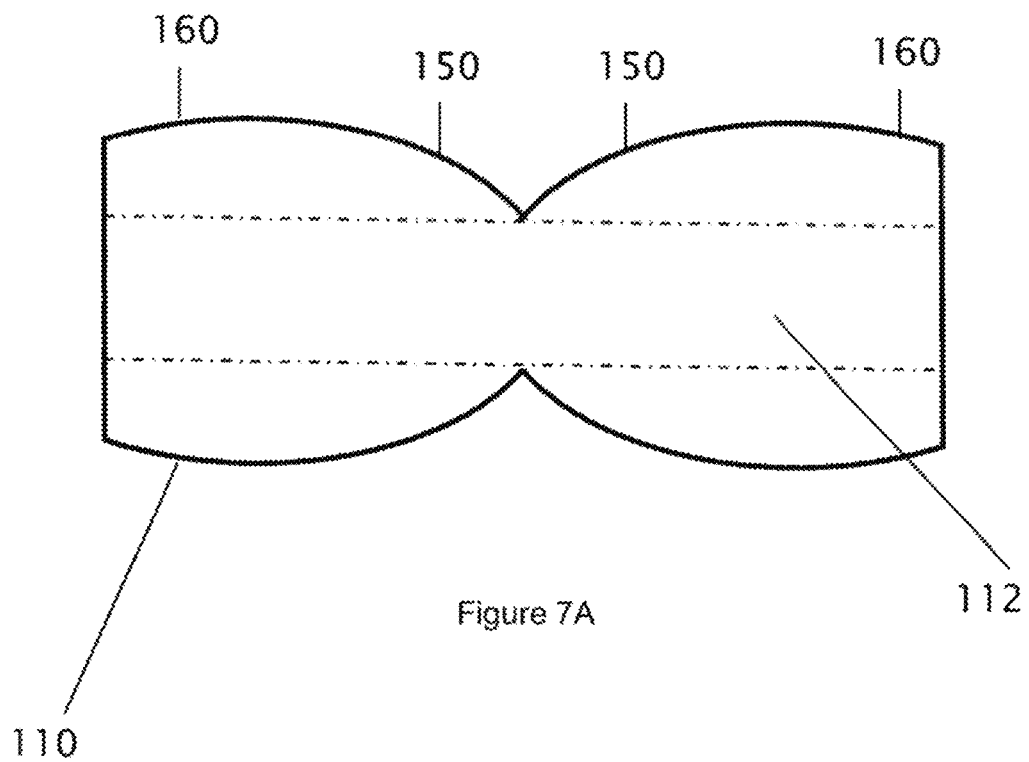
FIG. 7A is a plan view of a blank for forming a portion of the inner layer of the bowling ball enclosure.
Figure 7B:
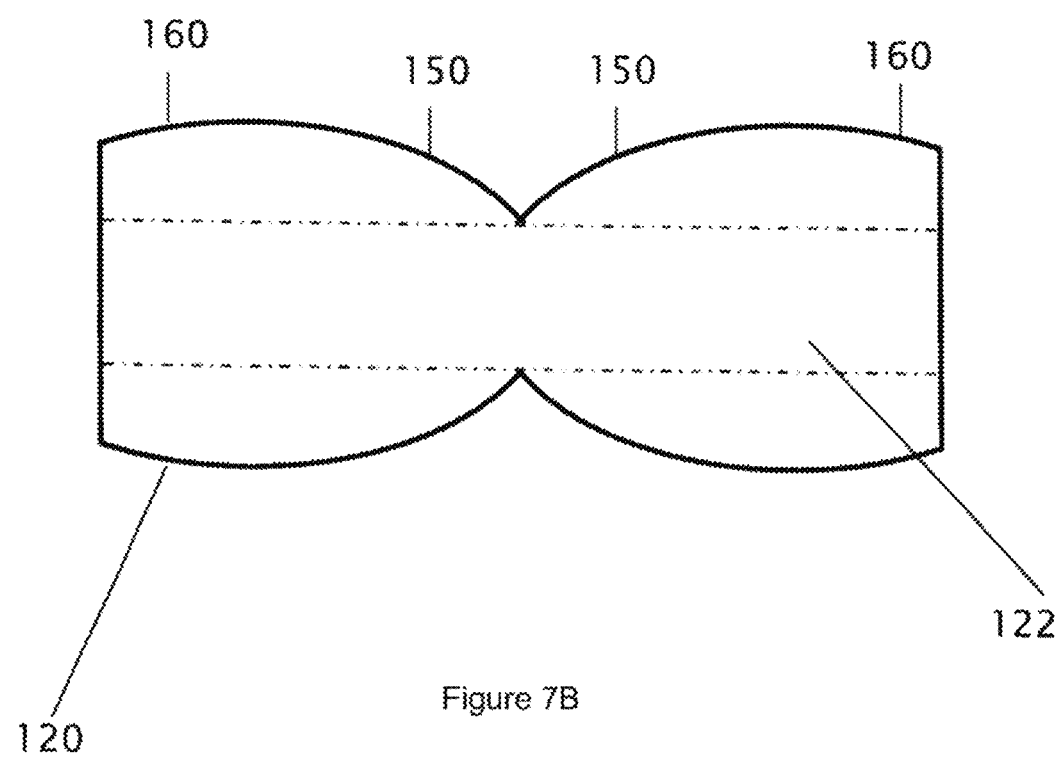
FIG. 7B is a plan view of a blank for shown forming a portion of the outer layer of the bowling ball enclosure.

Referring to FIGS. 7A and 7B, in one configuration, at least one of the flexible inner vapor barrier layer 110 and the flexible outer layer 120 may include a contiguous band of material 112, 122 respectively, extending from a top portion 160 of the bowling ball enclosure 100 through a bottom portion 150 of the bowling ball enclosure 100 to an opposing top portion 160 of the bowling ball enclosure 100. The contiguous band of material 112, 122 may be configured to be free of seams or joints, which could weaken the material of the bowling ball enclosure 100. Alternatively, it is understood there may not be a contiguous band of material free of seams if the width and strength of the heat seal, such as approximately 1/16 to 1/4 inch, particularly located at the bottom portion of the enclosure 100 is sufficient to support the weight of a bowling ball weighing between 6 and 16 pounds.

When the blank is formed up, the resulting bowling bowl enclosure 100 may include the bottom portion 150 and the top portion 160. The top portion 160 of the bowling ball enclosure 100 may be positionable from a first position to a second position to encapsulate the bowling ball 140 in the interior region 130 of the bowling ball enclosure 100.

Figure 2:
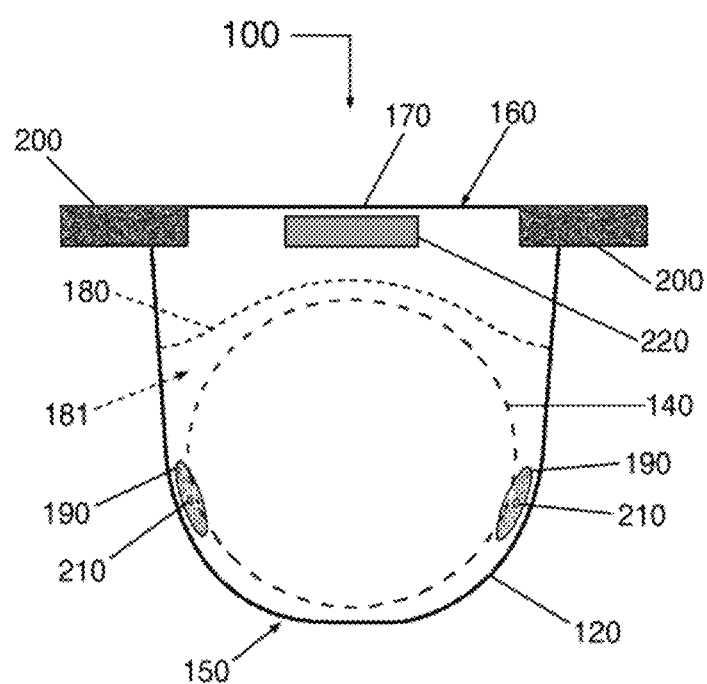
FIG. 2 is a front elevational view of the bowling ball enclosure in the first position, with the bowling ball shown in phantom.

In the first position, as shown in FIGS. 1 and 2, the top portion 160 of the bowling ball enclosure 100 may be in an open position to receive the bowling ball 140 into the interior region 130 of the bowling ball enclosure 100. The top portion 160 of the bowling ball enclosure 100 may have a circumference that is greater than the circumference of the bowling ball 140 to receive the bowling ball 140 into the interior region 130 of the bowling ball enclosure 100.

Figure 3:
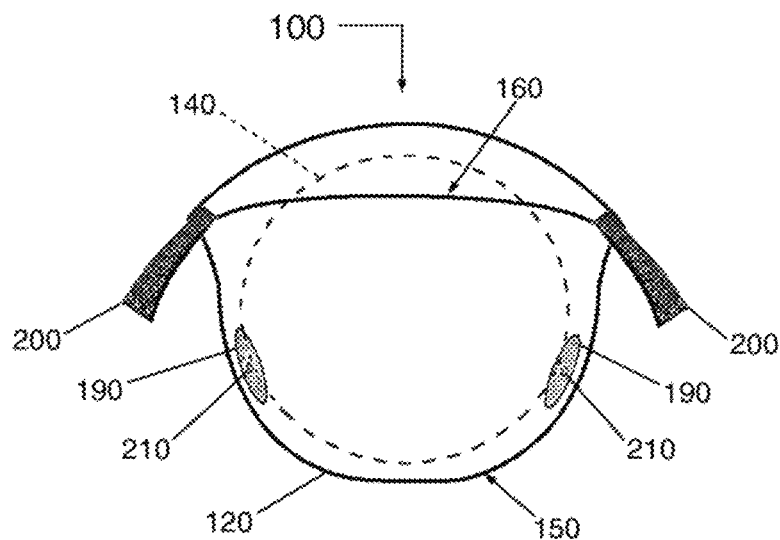
FIG. 3 is a front elevational view of the bowling ball enclosure transitioning to a second position, with the bowling ball shown in phantom.
Figure 4:
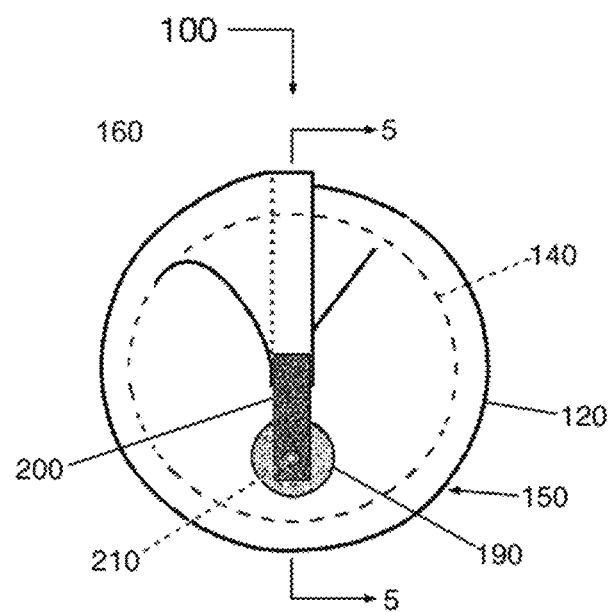
FIG. 4 is a side elevational view of the bowling ball enclosure in the second position, with the bowling ball shown in phantom.
Figure 5:
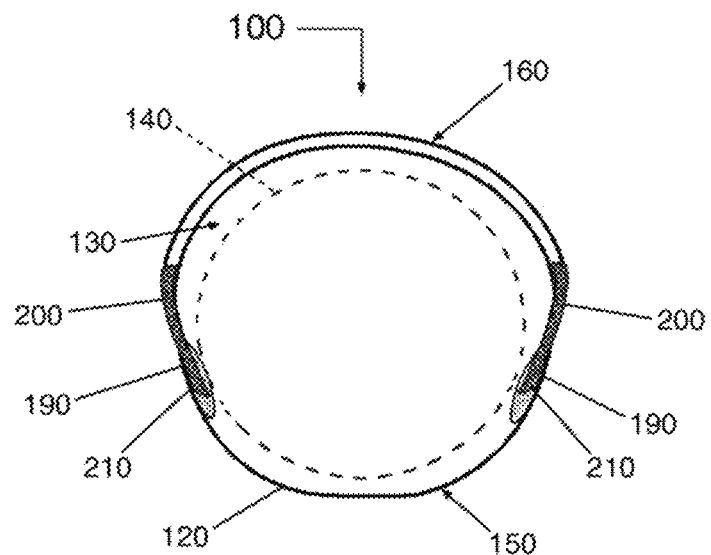
FIG. 5 is a front elevational view of the bowling ball enclosure in the second position, with the bowling ball shown in phantom.

In the second position, as shown in FIGS. 3-5, the top portion 160 of the bowling ball enclosure 100 may be in a closed position to encapsulate the bowling bowl 140 in the interior region 130 of the bowling ball enclosure 100. The top portion 160 of the bowling ball enclosure 100 may be folded towards the bottom portion 150 of the bowling ball enclosure 100 to decrease the amount of empty space in the interior region 130 of the bowling ball enclosure 100.

The top portion 160 of the bowling ball enclosure 100 may be reinforced with a stiffener 170 that may support the top portion 160 of the bowling ball enclosure 100. The stiffener 170 may also be connected to at least one of the inner layer 110 and the outer layer 120 of the bowling ball enclosure 100. In one configuration, the stiffener 170 is retained between the inner layer 110 and the outer layer 120 in the top portion 160 of the bowling ball enclosure 100. In one configuration, the stiffener 170 may have sufficient rigidity to retain the top portion 160 of the bowling ball enclosure 100 in an open arrangement when the bowling ball enclosure 100 is in the first position, yet as set forth below, the stiffener 170 may be sufficiently bendable to substantially follow the curve of the retained bowling ball 140. The stiffener 170 of the top portion 160 of the bowling ball enclosure 100 may be made of plastic, high-density polyethylene (HDPE), polyurethane, or any other material suitable for the intended purpose and understood by one or ordinary skill in the art.

The bowling ball enclosure 100 may also include a flexible insulation layer 180 intermediate the flexible inner vapor barrier layer 110 and the flexible outer layer 120 of the bowling ball enclosure 100. As seen in FIG. 2, the flexible insulation layer 180 of the bowling ball enclosure 100 may have a top portion or edge 181 that may be spaced from the stiffener 170 by a sufficient distance such that a portion of the flexible insulation layer 180 of the bowling ball enclosure 100 may be within the folded top portion 160 of the bowling ball enclosure 100 in the second position. That is, the thinner inner layer 110 and thinner outer layer 120 can be folded over or rolled at least once without disposing a portion of the flexible insulation layer 180 there between then after the inner and outer layers 110, 120 have a fold over, the next fold causes a portion of the flexible insulation layer 180 to be disposed within the subsequent fold, thereby ensuring the entire bowling ball is encapsulated by the flexible insulation layer 180 as well as the flexible inner and outer layers 110, 120.

In one configuration, the material of the flexible insulation layer 180 may be at least slightly compressible so that a portion of the insulation layer can be captured within the folded portion of the bowling ball enclosure 100 in the second position. In addition, the material of the flexible insulation layer 180 may have a sufficient R value to reduce the thermal stresses to the retained bowling ball 140 that would otherwise impart cracking or induce plasticizer oil seepage in hot ambient temperatures during normal usage and storage of the bowling ball 140. A satisfactory material for the material of the flexible insulation layer 180 may include recycled denim insulation, also known as natural cotton fiber insulation, made from scraps, chunks and clippings from the manufacture of denim clothing. In some configurations, the natural cotton fiber insulation includes a resin distributed throughout the insulation, wherein the resin provides a structure and resiliency to the resulting product. The uncompressed thickness of the insulation layer is between approximately ¼" and 1". Another flexible insulation can be fiberglass matt, closed or open cell foam, etc.

Figure 9A:
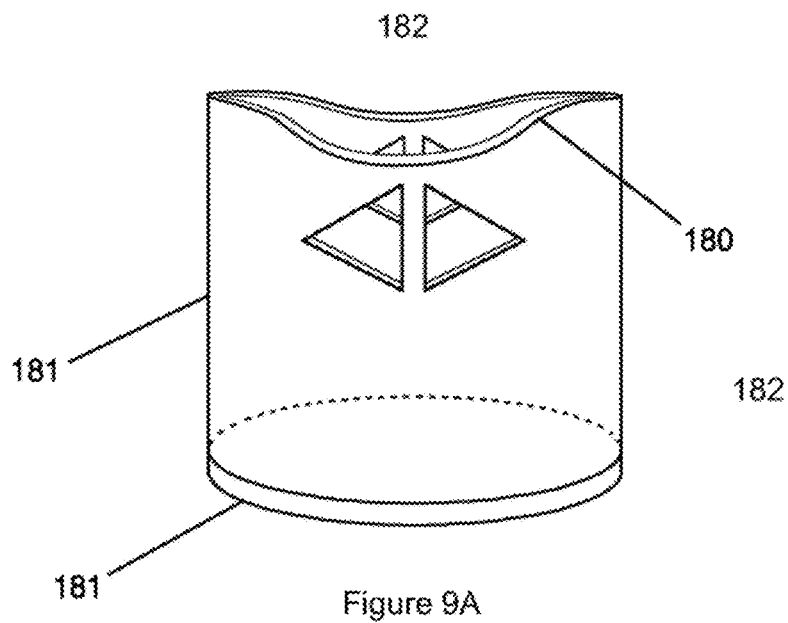
FIG. 9A is a perspective view of an assembled flexible insulation layer for retention between the inner layer and the outer layer.
Figure 9B:
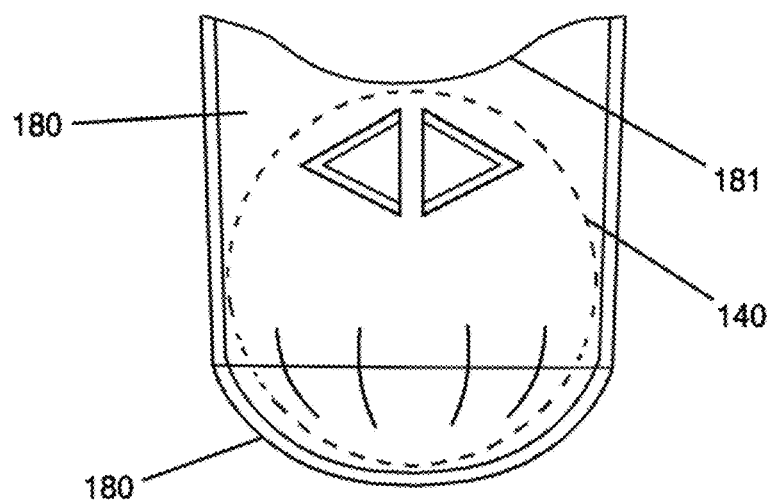
FIG. 9B is a side elevational view showing a bowling ball shape, relative to the assembled flexible insulation layer of FIG. 9A, conforming about a bowling ball shown in phantom.
Figure 10A:
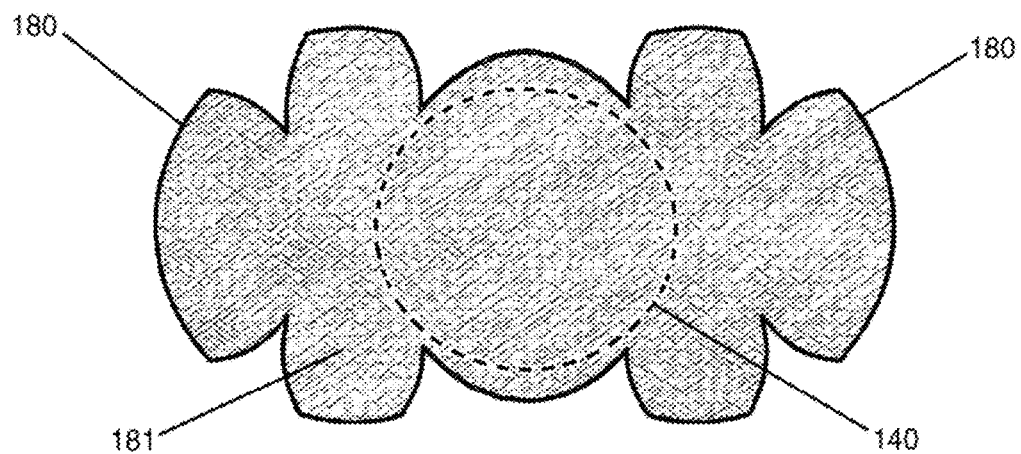
FIG. 10A is a blank of a flexible insulation material for forming the insulation layer.
Figure 10B:
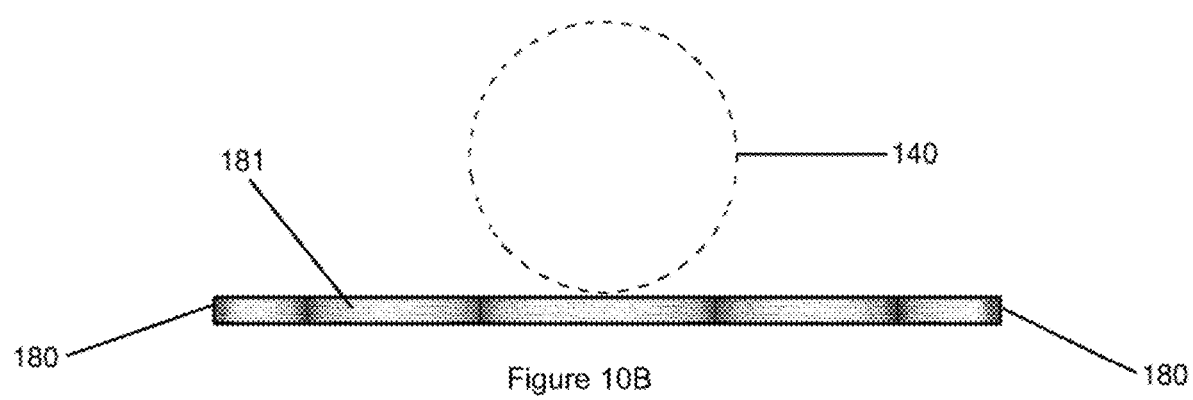
FIG. 10C is a side elevational view of the blank of FIG. 10A in an assembled configuration or closed position of the bowling ball enclosure.
Figure 10C:
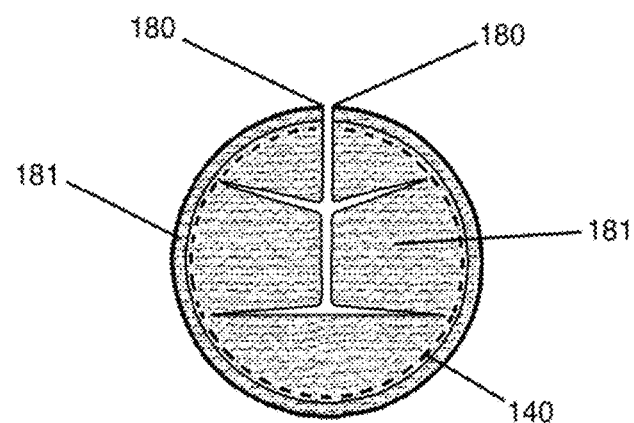
Figure 11A:
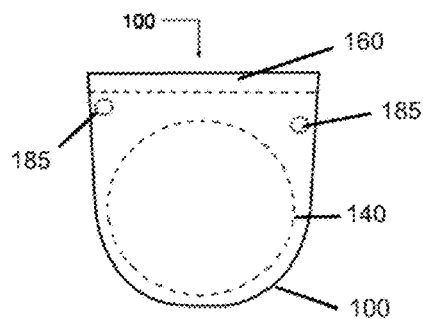
FIG. 11A is a side elevational view of the enclosure retaining the bowling ball, wherein the enclosure is in the open position and the bowling ball is shown in phantom.
Figure 11B:
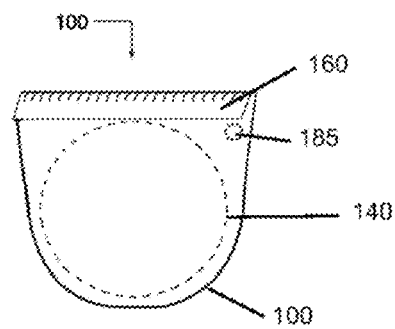
FIG. 11B is a side elevational view of the enclosure of FIG. 11A, wherein a top portion of the enclosure is partly folded along a first direction.
Figure 11C:
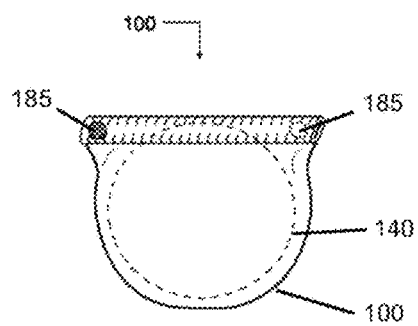
FIG. 11C is a side elevational view of the enclosure of FIG. 11B, wherein the top portion of the enclosure is fully folded along the first direction.
Figure 11D:
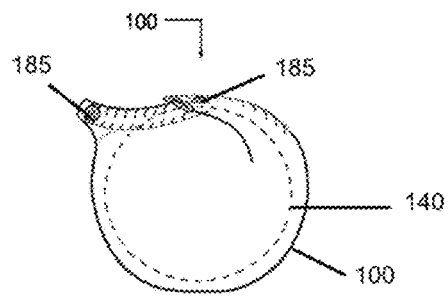
FIG. 11D is a side elevational view of the enclosure of FIG. 11C, wherein the folded top portion is partly folded along a second direction.
Figure 11E:
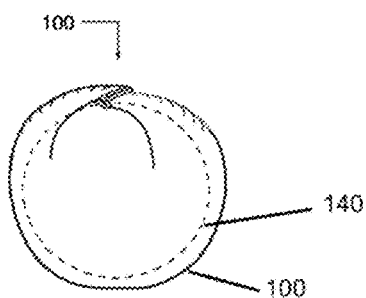
FIG. 11E is a side elevational view of the enclosure of FIG. 11D, wherein the folded top portion is fully folded about the second direction and the releasable fasteners are engaged.

Referring to FIGS. 9A and 9B, the flexible insulation layer 180 can be formed by a rectangular sheet and a disk of insulation material. The rectangular sheet of insulation material may be rolled into a cylinder and joined along the longitudinal seam define an open top and an open bottom. The disk of insulation material may be joined to the cylinder of insulation material at the open bottom to form a closed end.

As seen in FIGS. 9A and 9B, the flexible insulation layer 180 can include cut outs 182 which provide for the insulation moving from a first open position to a second closed position. In one configuration, the rectangular cut out may incorporate strategic removal in certain areas resembling triangles to minimizing overlapping of the insulation layers while in the closed position. Thus, in the closed position, the insulation layer does not create bulges from multiple overlapping layers of the insulation. Referring to FIGS. 3-5 and 11, the cut outs remove sufficient amount of the insulation so that the insulation layer 180 can be rolled about an axis extending between two sets of the cut outs.

The bowling ball enclosure 100 may further include releasable fasteners 185, such as bottom releasable fasteners 190 that may be positioned on the flexible outer layer 120 on the bottom portion 150 of the bowling ball enclosure 100. The bottom releasable fasteners 190 may be circular in shape, but may be any shape suitable for the intended purpose and understood by one of ordinary skill in the art. The bowling ball enclosure 100 may also include top releasable fasteners 200 that may be positioned on the top portion 160 of the bowling ball enclosure 100. The top releasable fasteners 200 may be in the shape of a strip with a width similar to the width of the stiffener 170, but may be any shape suitable for the intended purpose and understood by one of ordinary skill in the art.

The top releasable fasteners 200 may be fastened to the bottom releasable fasteners 190 when the bowling ball enclosure 100 is in the second position. The bottom releasable fasteners 190 and the top releasable fasteners 200 of the bowling ball enclosure 100 may be hook-and-loop fasteners or any other fastener suitable for the intended purpose and understood by one of ordinary skill in the art.

In a further configuration, seen in FIGS. 11A-11E, the closed position of the bowling ball enclosure 100 includes a folded top, wherein the releasable fastener 185, such as complementary hook and loop fasteners or snaps, is located at spaced locations along the top of the bowling ball enclosure. The top portion 160 of the bowling ball enclosure 100 may fold over itself, once or twice, and then opposing ends of the folded section are brought towards each other across the top of the bowling ball 140 and the releasable fastener 185 is engaged to retain the releasable fastener and the bowling ball enclosure in the closed position. Thus, the bowling ball enclosure 100 is closed over the top of the enclosed bowling ball 140. In this position of the bowling ball enclosure 100, the insulation layer 180 encompasses at least 75% of the bowling ball 140 and referring to 10C over 90% of the bowling ball.

In some configurations, the bowling ball enclosure 100 may include at least one aperture 210, such as a vent port, to allow the introduction and expulsion of air from the interior region 130 of the bowling ball enclosure when bowling ball enclosure 100 transitions from the first position to the second position or when the bowling ball is inserted or extracted from the bowling ball enclosure. The aperture 210 of the bowling ball enclosure 100 may be a grommet which effectively connects the inner vapor barrier layer, the insulation layer and the outer vapor barrier layer. It is further contemplated, the vent port 210 may be formed in one of the releasable fasteners. The grommet can engage a load distributing washer (not shown) between the grommet and the adjacent inner layer 110 and/or outer layer 120, wherein the washer is a plastic, such as but not limited to polyethylene or nylon having a thickness of approximately 1 mm. The load distributing washer slightly conforms to shape of the grommet and is compressed into the material of the enclosure 100 so as to provide a contact barrier between the head of the grommet and the enclosure, thereby reducing wear on the inner layer 110 and/or the outer layer 120.

In one configuration, the vent port 210 is spaced from the bottom portion of the enclosure 100, such as the bottom 25% of the enclosure, where the weight of the bowling ball and conformity of the receptacle causes the flexible inner vapor barrier to be is tight against the concave shape of the bowling ball 140. This conformity of the enclosure with the bowling ball 140 materially inhibits the movement of air between the flexible inner vapor barrier and the bowling ball, thus reducing passage of vapors through the vent port.

It is contemplated that locating the vent port 210 above a midpoint of the retained bowling ball 140 will permit the necessary ingress and egress of air to permit substantially unresisted movement of the enclosure from the open position to the closed position, as well as insertion and extraction of the bowling ball 140 from the enclosure.

Alternatively, or additionally, the vent port 210 can be located along a fold or pleat in the flexible inner vapor barrier 110, where the fold or pleat forms a channel for the passage of air. Thus, the enclosure can be configured to form a channel from the vent port to a spaced location within the enclosure, upon the releasable fastener being disposed in the closed position. For example, the vent port 210 may be located in the enclosure to be within the top third of the height of the bowling ball as retained within the enclosure, wherein the vent port may be centrally located relative to a vertical axis of the retained bowling ball or circumferentially disposed.

In a further configuration, the venting of the enclosure 100 can be accommodated by affixing the grommet to the insulation layer 180 and one of the inner layer 110 and the outer layer 120, wherein the remaining one of the inner layer and the outer layer includes at least one and in some configurations a plurality of holes. For example, in the configuration having the grommet that secures the insulation layer 180 to the outer layer 120, the inner layer 110 can include the plurality of holes, wherein during closing the enclosure, the air passes through the holes in the inner layer 110, through the insulation layer and exits the outer layer through the grommet. While this accommodates the high pressure differential when inserting or extracting a bowling ball, the flow path is sufficiently tortuous and the apertures sufficiently small that transport of any vapors through the vent is effectively precluded.

It is also contemplated that in one configuration of the enclosure 100, the enclosure is free of vent ports 210. That is, the enclosure 100 may be configured for limited use, such as within a shipping or packaging box 240, wherein repeated withdrawn and insertion of the bowling ball is not encountered, thus the need for the venting ports 210 is reduced.

In one configuration, the bottom releasable fasteners 190 may also be on opposing sides of the bottom portion 150 of the bowling ball enclosure 100 such that opposing sides of the bottom portion 150 of the bowling ball enclosure 100 are fully supported in the second position. The top releasable fasteners 200 may be on opposing sides of the top portion 160 of the bowling ball enclosure 100 such that opposing sides of the top portion 160 of the bowling ball enclosure 100 are fully supported in the second position.

The bowling ball enclosure 100 may also include grips 220 that may be positioned on opposing sides of the outer layer 120 and below the stiffener 170 of the top portion 160 of the bowling ball enclosure 100. The grips 220 of the bowling ball enclosure 100 may assist a user in holding the bowling ball enclosure 100 with one hand when the bowling ball enclosure 100 is in the second position. The grips 220 can be formed of patches of material bonded to the outer layer 120, wherein the material of the grips 220 may have a higher coefficient of friction than the material of the outer layer 120. In one configuration, the grips 220 may be a thermoplastic elastomer. The bowling bowl enclosure 100 may also utilize one of the grips 220 to assist the user in positioning the top portion 160 of the bowling ball enclosure 100 from the first position to the second position. In one configuration, the bowling ball enclosure 100 includes at least two grips 220 being positioned on opposing sides of the outer layer 120 and below the stiffener 170 of the top portion of the bowling ball enclosure allowing for alternate folding directions, wherein the grips assist a user in holding the bowling ball enclosure when the bowling ball enclosure is closed about the bowling ball to encapsulate the bowling ball.

The bowling ball enclosure 100 defines a height and a width. In one configuration, a center/midpoint of the bottom releasable fasteners 190 of the bowling ball enclosure 100 may be positioned at or below the midpoint of the height of the bowling ball enclosure 100. In this configuration, the bottom releasable fasteners 190 support the bowling ball enclosure 100 when held by the user in the second position. That is, by the bottom releasable fasteners 190 being engaged below the midpoint of the bowling ball 140 retained within the bowling ball enclosure 100, a portion of the weight of the bowling ball 140 may be carried by the folded material of the inner layer 110 and outer layer 120, rather than by the layers alone. For example, in the second position, if the bottom releasable fasteners 190 of the bowling ball enclosure 100 are above the midpoint of the height of the bowling ball enclosure 100, the bowling ball enclosure 100 may have an increased tendency to tear due to the tension caused by the weight of the bowling ball 140, or the releasable fasteners would not have enough retention force due to the angle of the force resulting from lifting the enclosure retaining the bowling ball.

However, as set forth above, the releasable fastener of the enclosure may be position between the open position and the closed position such that the releasable fastener remains located above the bowling ball in the enclosure. That is, the releasable fastener in the closed position is on top of the bowling ball and thus there is no handle formed for carrying the enclosed bowling ball 140.

Figure 6:
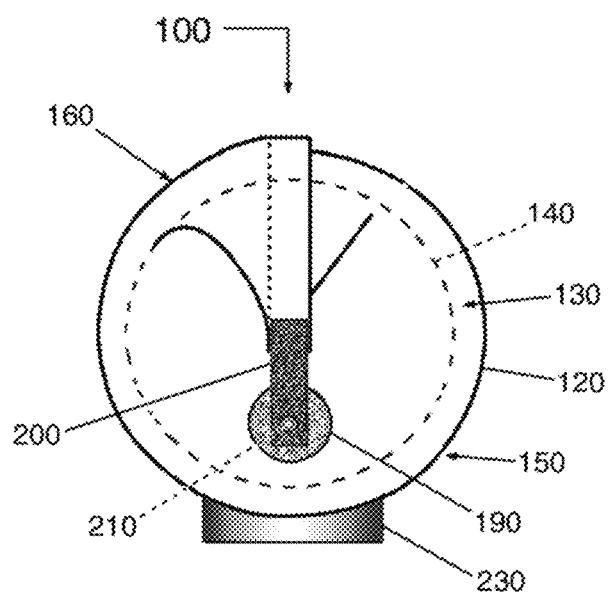
FIG. 6 is a side elevational view of the bowling ball enclosure including a thermal resistor intermediate a support surface and the bowling ball enclosure.

As shown in FIG. 6, in one configuration of the system, the bowling ball enclosure 100 may further include or cooperate with a substantially incompressible thermal resistor in the configuration of either a bottom perforated circulating ring support 230 or an insulating disk or an insulated contoured cup that may be positioned at the bottom portion 150 of the bowling ball enclosure 100. Substantially incompressible includes a thermal resistor that compresses or increases in density by less than 50%, and in some configurations less than 5%.

The bottom perforated circulating ring support 230 of the bowling ball enclosure 100 may be configured to position the bowling ball 140 in a particular portion of the interior region 130 of the bowling ball enclosure 100. The bottom perforated circulating ring support 230 also allows the bowling ball 140 to be further separated from the ground or support surface to decrease the temperature difference between the top and bottom regions of the bowling ball 140. The bottom perforated circulating ring support 230 may be positioned on the outside of the outer layer 120 of the bowling ball enclosure 100.

The bottom perforated circulating ring support 230 of the bowling ball enclosure 100 may be made of a rigid and insulation material or any other material suitable for the intended purpose and understood by one of ordinary skill in the art. In select configurations, the bottom perforated circulating ring support 230 is polymeric including plastic, or rubber or thermoset. The bottom perforated circulating ring support 230 may be permanently attached to the bowling ball enclosure 100 by an adhesive, stitching, sewing, stamping, or any other method suitable for the intended purpose and understood by one of ordinary skill in the art. It is further contemplated the bottom perforated circulating ring support 230 can be releasably connected to the bowling ball enclosure 100 such as by hook and loop fasteners, engaging loops or strings. It is also understood, the bottom perforated circulating ring support 230 can be entirely separate from the bowling ball enclosure 100, wherein the user can locate the bottom perforated circulating ring support 230 within the bowling ball enclosure 100 when not in use and locate the bottom perforated circulating ring support 230 between the bowling ball enclosure 100 and the floor when in use.

It is further contemplated the bottom perforated circulating ring support 230 can be coupled to the bowling ball enclosure 100 by a tether 280, such as a cord, a strap or a binding to preclude unintended separation of the bottom perforated circulating ring support from the bowling ball enclosure 100. The tether 280 can have a sufficient length to permit operable location of the bottom perforated circulating ring support 230 outside the bottom surface of the bowling ball enclosure 100 and storage location within the bowling ball enclosure 100.

Figure 8:
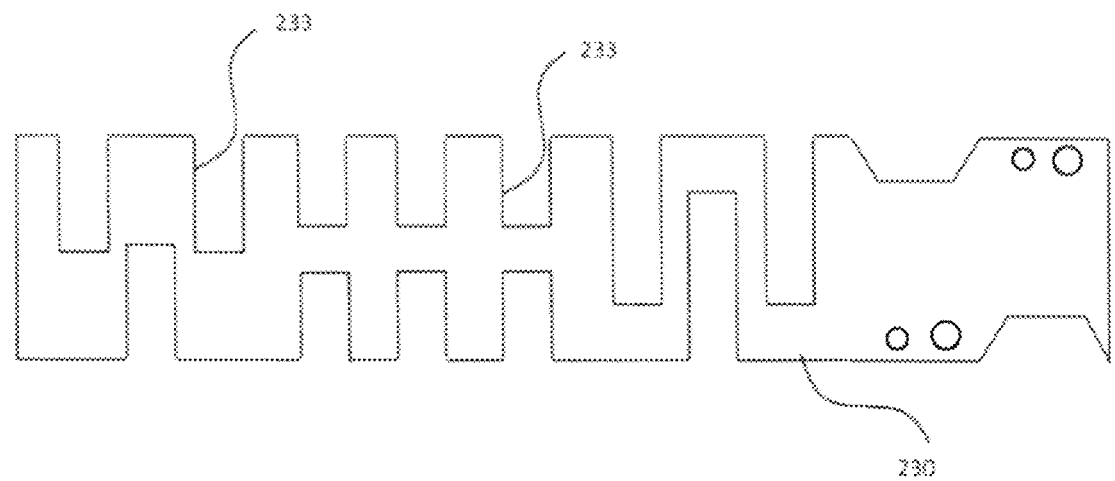
FIG. 8 is a side elevational schematic of various configurations of the bottom perforated circulating ring support.

As seen in FIG. 8, the bottom perforated circulating ring support 230 includes a plurality of apertures or passages 233 to permit an air flow between an interior of the bottom perforated circulating ring support and an exterior of the bottom perforated circulating ring support. The passages 233 can have a closed periphery or be formed by recesses, slots, openings, or holes extending from a top and/or bottom edge of the bottom perforated circulating ring support. The slots can have a height so that the slots extend more than half a height of the bottom perforated circulating ring support and thus the slots are offset. Alternatively, the slots can be vertically aligned and extend less than half a height of the bottom perforated circulating ring support 230. In one configuration, the passages 233 are sufficient to allow a temperature differential to form within a volume defined by the support surface, the bottom perforated circulating ring support 230 and the bottom of the bowling ball enclosure 100 that is positioned over and on the bottom perforated circulating ring support. Without such perforations or slots 233, the ring support would create a column of air that is retained within the support, wherein the column of air directly transfers the temperature of the ground or support surface to the flexible outer layer 120 of the bowling ball enclosure 100, which may impart a cracking of a bowling ball 140 retained within the bowling ball enclosure. However, the slots 233 are sufficient to create a convection through the bottom perforated circulating ring support 230 to preclude the creation of a stagnant column of air.

In the configuration of the thermal resistor as an insulating disk or cup, the insulating disk or cup is free of apertures or passageways through the disk. That is, the insulating disk does not create a stagnant column of air between the bottom of the enclosure and the floor. Further, in the configuration of the thermal resistor as an insulating disk, the insulating disk is sufficiently incompressible with respect to the weight of the bowling ball to resist a compression which would reduce the R value of the insulating disk by more than 20%.

It is believed an advantage of the perforated circulating ring support 230 is the reduced area of contact with the enclosure and hence reduced area of compression of the flexible insulation layer 180. As some insulations rely upon trapped air, a local compression of the insulation layer can result in a local reduced R value of the flexible insulation layer 180.

It is believed that in an equilibrium state, a temperature differential between the two polar regions (250 and 260) of the bowling ball 140 can be limited to approximately 3-4° F. by means of the bottom perforated circulating ring support vs. an approximately 5-10° temperature differential using a solid non-perforated ring support. That is, it is believed that in one configuration in an equilibrium state, the temperature differential between the two polar regions (250 and 260) can be reduced by approximately 50% by means of the bottom perforated circulating ring support vs. the temperature differential with a solid non-perforated ring support.

The bottom perforated circulating ring support 230 can have a height from approximately 0.5 inches to approximately 5 inches, wherein in one configuration the height is between approximately 0.75 inches and 1.5 inches. The diameter of the bottom perforated circulating ring support 230 can be between approximately 2 inches to 6 inches, wherein the height and diameter of the bottom perforated circulating ring support 230 are selected to provide for spacing of the bowling ball 140 or bowling ball enclosure 100 from any support surface by at least 0.2 inches. It is noted that as the diameter of the bottom perforated circulating ring support 230 increases, the height of the bottom perforated circulating ring support must increase to maintain the desired spacing from the support surface. The diameter and height of the bottom perforated circulating ring support 230 are selected for retaining the bowling ball enclosure and maintaining the necessary stability for the intended location of the bowling ball enclosure. In one configuration, in order for the poles of the bowling ball 140 to remain within 3-4° F. of each other when placed on a surface that is 10° F. below the ambient air temperature, the bowling ball must be placed on a ½" high and 2.5" diameter bottom perforated circulating ring support 230 to interrupt the thermal conductivity from the support surface as well as compensate for the local compression of the insulation layer 180.

The method of utilizing the bowling ball enclosure 100 to encase and reduce temperature fluctuations of the bowling ball 140 may include providing the bowling ball enclosure 100, inserting the bowling ball 140 into the interior region 130 of the bowling ball enclosure 100, closing the top portion 160 of the bowling ball enclosure 100 to encapsulate the bowling ball 140 in the interior region 130 of the bowling ball enclosure 100, folding the top portion 160 of the bowling ball enclosure 100 towards the bottom portion 150 of the bowling ball enclosure 100, thereby expelling the air from the interior region 130 of the bowling ball enclosure 100, and attaching the top releasable fasteners 200 to each of the respective bottom releasable fasteners 190 of the bowling ball enclosure 100. As the bowling ball enclosure 100 is transitioned to the second position, the absence of the insulation layer 180 adjacent the stiffener, allows the folding of the inner and outer layers with the stiffener of at least 180 degrees and in select configurations to approximately 270 degrees. From 270 degrees to 360 to 405 degrees, the upper portion of the insulation layer is then caught in the formed folds and thus encases the retained bowling ball. That is when the bowling ball enclosure 100 is in the closed, second position, the insulation layer 180 in one configuration, encompasses at least 75% of the surface area of the retained bowling ball, and in other configurations the insulation layer encompasses at least 85% and in further configurations the insulation layer encompasses at least 95% and in some configurations the insulation layer encompasses 100% of the surface area of the retained bowling ball.

In a further configuration, the method of utilizing the bowling ball enclosure 100 to encase and reduce temperature fluctuations of the bowling ball 140 may include providing the bowling ball enclosure 100, inserting the bowling ball 140 into the interior region 130 of the bowling ball enclosure 100, closing the top portion 160 of the bowling ball enclosure 100 to encapsulate the bowling ball 140 in the interior region 130 of the bowling ball enclosure 100, folding a first section of the top portion 160 of the bowling ball enclosure 100 towards an opposing section of the top portion of the bowling ball enclosure 100, thereby expelling the air from the interior region 130 of the bowling ball enclosure 100, and attaching the top releasable fasteners 200 (or releasable fastener 185) to retain the bowling ball enclosure 100 in the closed position. As the bowling ball enclosure 100 is transitioned to the second position, the local absence of the insulation layer 180 in the top portion 160, allows the folding of the flexible inner vapor barrier layer and flexible outer layer upon themselves, without any intermediate insulation layer, in the top portion.

Figure 12:
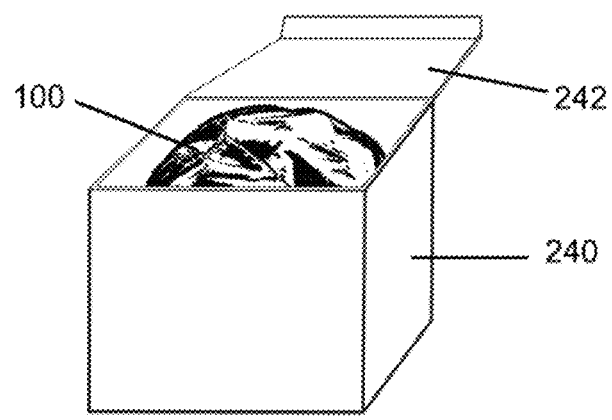
FIG. 12 is a perspective view of the bowling ball in the enclosure within a packaging box.
Figure 13:
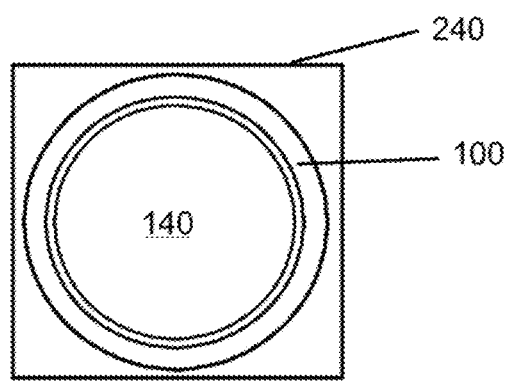
FIG. 13 is a top schematic view of the bowling ball within the bowling ball enclosure, and the bowling ball enclosure retained within a packaging box.

Referring to FIGS. 12 and 13, in a further configuration, the bowling ball enclosure 100 is used to encase a bowling ball 140 in a typical commercially available packaging box. That is, in many instances a new bowling ball is disposed in a single layer plastic bag and then retained within a cardboard cubic packaging box having an outer dimension of approximately 8.6 inches. The packaging box 240 has an open configuration wherein at least one flap, lid, 242 is located to permit passage of the bowling ball 140 into and out of the box. It is understood the box 240 may include two, three or four flaps that are moveable between the open configuration and the closed configuration of the box. The at least one flap 242 is then moved to a closed position to enclose the bowling ball 140 within the box. A fastener such as tape or adhesive can be used to retain the flap (or flaps) in the closed position during shipment and presentation to the consumer.

The present bowling ball enclosure 100 can be used to encase the bowling ball 140 as the bowling ball is retained within the box 240, wherein the enclosure includes the folded over top portion 160 at the top of the bowling ball, and the enclosure is free of the stiffener. Thus, a bowling ball kit is provided having the box 240 having an open configuration and a closed configuration, wherein the box in the closed configuration defines an interior cubic volume of less than 730 $in^3$; the bowling ball 140 having a diameter between 8.500 inches (21.59 cm) to 8.595 inches (21.83 cm); and the enclosure 100 enclosing the bowling ball, the enclosure having a flexible inner vapor layer, a flexible outer layer and a flexible insulation layer intermediate the flexible inner vapor barrier layer and the flexible outer layer, wherein the enclosure is configured to enclose the bowling ball and be enclosed within the box in the closed configuration of the box. The enclosure 100 includes the releasable fasteners 185 which are moveable between an open position (and open or first position of the enclosure) for receiving or removing the bowling ball 140 and the closed position (and the second or closed position of the enclosure) encapsulating the bowling ball. It is contemplated the enclosure does not include the stiffener 170 in this configuration, as volume of the enclosure is minimized to provide for retention within the box 240. However, by disposing the releasable fastener 185 and the correspondingly the enclosure 100 in the closed position, the flexible inner vapor barrier layer 110 encompasses the bowling ball 140 and thereby reduces the evaporation of volatiles from the bowling ball, thereby preserving the as manufactured properties of the bowling ball.

Thus, the present system addresses current bowling balls formed of reactive urethane resins which can render the balls prone to cracking due to (i) rapid or uneven changes in the temperature of the ball as a whole and (ii) rapid or uneven changes in the temperatures between the multiple layers whereas the reactive urethane coverstock encases the core and filler materials which is are made from different density materials.

In addition, the present system addresses uneven temperatures that are presented to the bowling ball 140 during storage on a floor, wherein the floor has a temperature that is different from the ambient air temperature. This temperature differential is typical of storage of the bowling ball in a hall, garage or basement, wherein the floor temperature is more than 6° F. colder than the ambient air temperature.

In addition, the present system assists in reducing the propensity of reactive urethane resin balling balls to crack as the ball ages and dries out and also reduces the rate at which the bowling ball and particularly the coverstock loses its factory fresh chemicals and plasticizers. The present system thereby preserves and extends the manufacturer's originally intended performance characteristics of the coverstock's surface area engagement with the bowling lane surface.

The present design provides a number of advantages including (i) a configuration which provides for a compact encasing of the bowling ball 140 so as to fit into most commercially available bowling ball bags as well as providing efficient use of materials and manufacturing steps for cost efficiency; (ii) use of the vapor barrier material, such as Mylar® polyester film, for the inner and outer layer seals the bowling ball against resin evaporation thereby minimizing evaporative aging which can eventually lead to cracking—or making the bowling ball more susceptible to cracking; (iii) the Mylar® film increasing resistance to solar radiation and heating; (iv) effective encapsulation of the retained bowling ball with the insulation layer 180 sandwiched between in the inner and the outer layer 110, 120 such that as the bowling ball enclosure is moved to the second position, there are no material gaps in the insulation surrounding the bowling ball, in addition the flexible insulation layer insures conformity to the spherical bowling ball as well as uniformity of the temperature of the bowling ball around the entire spherical surface. The present structure reduces relative cold or hot spots that can lead to cracking if the temperature differential exceeds approximately 5° F. or greater.

The present design and flexibility of the inner and outer layers 110, 120 along with the insulation layer 180 offers easy insertion and removal of the bowling ball 140 which is crucial for the convenience of the user.

In one configuration, the semi-rigid plastic stiffener 170 which can be used to connect or bond both inner and outer layers 110, 120 along the top of the upper portion facilitates a mechanism for a quick and easy sealing of the bowling ball enclosure 100 about the bowling ball 140.

In one configuration, the hook and look fasteners located at the end regions of the sealing strip attach to mating hook and look fasteners located below the center region of the bowling ball enclosure and are positioned below an equator of the retained bowling ball to bear the weight of the balling ball and leverage the gripping angle of the fasteners.

In one configuration, the vent holes in the releasable fasteners allow for venting of trapped air while allow for subsequently sealing upon being covered over by the mating releasable fasteners.

Further, the construction of the monolithic flexible inner vapor barrier layer and outer flexible layers 110, 120 of the laminated film as set forth above allows for a vertically positioned non-sealed (including heat sealed) strap or band of unbroken or seam free material within each of the inner and outer layers to maximize the weight bearing ability of the bowling ball enclosure. It is anticipated the bowling ball may weigh from approximately 6 pounds to 16 pounds. Thus, by having at least one of the inner and outer layers 110, 120 define a continuous band of material to support the weight of the bowling ball, load carrying capacity of any formed seams can be reduced by the design of the respective layer. To accomplish an almost equivalent load carrying capacity, there may not be a contiguous band of material free of seams if the width and strength of the heat seal portion, particularly located at the bottom portion of the enclosure 100, is sufficient to support the weight of a bowling ball weighing between 6 and 16 pounds.

In one configuration, the present system also provides a useful handle after transitioning the closure from the first position to the second position, wherein the folded sections of the inner and outer layer in conjunction with the stiffener for the handle for ease of carrying. The inclusion of the rubber strip grip reduces slipping during transport.

The invention has been described in detail with particular reference to a present preferred embodiment, but it will be understood that variations and modifications can be effected within the spirit and scope of the disclosure. The presently disclosed embodiments are therefore considered in all respects to the illustrative and not restrictive. The scope of the disclosure is indicated by the appended claims, and all changes that come within the meaning and range of equivalents thereof are intended to be embraced therein.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub combination.

What is claimed is:

1. A bowling ball enclosure assembly configured to encase a bowling ball and reduce evaporative aging of the bowling ball, the bowling ball enclosure assembly comprising:
   (a) a flexible inner vapor barrier layer forming an open enclosure sized to receive the bowling ball, the open enclosure having a concave bottom to support the bowling ball;
   (b) a flexible outer layer encompassing the inner vapor barrier layer;
   (c) a flexible insulation layer intermediate the inner vapor barrier layer and the flexible outer layer; and
   (d) a releasable fastener connected to the flexible inner vapor barrier and the flexible outer layer, the releasable fastener moveable between (i) an open position sized to permit passage of the bowling ball into the enclosure and (ii) a closed position enclosing the bowling ball within the enclosure,
   wherein the flexible insulation layer encompasses at least 75% of the bowling ball in the closed position of the releasable fastener.

2. The bowling ball enclosure assembly of claim 1, further comprising a vent port extending through the flexible inner vapor barrier layer, the flexible insulation layer and the flexible outer layer, the vent port configured to permit the passage of air into and out of the enclosure.

3. The bowling ball enclosure assembly of claim 1, wherein the flexible outer layer defines a concave surface to support the bowling ball.

4. The bowling ball enclosure assembly of claim 1, wherein the flexible insulation layer defines a concave surface in the closed position of the releasable fastener.

5. The bowling ball enclosure assembly of claim 1, wherein the inner vapor barrier layer has a water vapor transmission rate of less than 2 g/100 in$^2$/24 hr.

6. The bowling ball enclosure assembly of claim 1, further comprising a vent port intermediate the concave bottom of the flexible inner vapor barrier layer and the releasable fastener.

7. The bowling ball enclosure assembly of claim 1, wherein the releasable fastener in the closed position disposes the enclosure in a contoured shape corresponding to a bowling ball.

8. The bowling ball enclosure assembly of claim 1, wherein the releasable fastener in the closed position disposes the enclosure in a spherical shape.

9. The bowling ball enclosure assembly of claim 1, wherein the flexible insulation layer defines a continuous layer overlying at least a lower 20% of the volume of a bowling ball retained within the enclosure.

10. The bowling ball enclosure assembly of claim 1, wherein the releasable fastener includes a stiffener.

11. The bowling ball enclosure assembly of claim 1, wherein the flexible outer layer is a vapor barrier.

12. The bowling ball enclosure assembly of claim 1, wherein the flexible insulation layer is sufficient to preclude a temperature change in a temperature of the bowling ball from 70° F. to 90° F. in response to exposure of the bowling ball in the bowling ball enclosure in the closed configuration to an ambient temperature of 120° F. for five hours.

13. The bowling ball enclosure assembly of claim 1, further comprising an insulating disk at a bottom of the enclosure.

14. The bowling ball enclosure assembly of claim 1, further comprising an insulating disk at a bottom of the enclosure, wherein the insulating disk has an R-value between 1.5 and 3.

15. The bowling ball enclosure assembly of claim 1, further comprising a vent port in a grommet, wherein the grommet forms a connection of the flexible inner vapor barrier layer, the flexible outer layer and the flexible insulation layer.

16. A bowling ball kit comprising:
   (a) a box having an open configuration and a closed configuration, wherein the box in the closed configuration defines an interior cubic volume of less than 730 in$^3$;
   (b) a bowling ball having a diameter between 8.500 inches (21.59 cm) to 8.595 inches (21.83 cm); and
   (c) an enclosure enclosing the bowling ball, the enclosure having a flexible inner vapor layer, a flexible outer layer and a flexible insulation layer intermediate the flexible inner vapor barrier layer and the flexible outer layer,
   wherein the enclosure is configured to enclose the bowling ball and be enclosed within the box in the closed configuration of the box.

17. The bowling ball kit of claim 16, wherein the flexible outer layer is a vapor barrier.

18. The bowling ball kit of claim 16, wherein the box is formed of cardboard.

19. A method of utilizing a bowling ball enclosure to encase and reduce temperature fluctuations and plasticizer evaporation of a bowling ball, the method comprising:
   providing the bowling ball enclosure, the bowling ball enclosure comprising:
      a flexible inner vapor barrier layer and a flexible outer layer that are made of a polymer material, the flexible inner vapor barrier layer forming an interior region that receives the bowling ball;
      a bottom portion and a top portion, the bottom portion having a concave surface for receiving a portion of the bowling ball and the top portion being positionable from a first position to a second position:
         in the first position, the top portion being open to receive the bowling ball into the interior region; and
         in the second position, the top portion being closed to encapsulate the bowling bowl;
      a flexible insulation layer intermediate the flexible inner vapor barrier layer and the flexible outer layer, the flexible insulation layer having an upper configuration to permit the inner vapor barrier layer to contact the flexible outer layer in the second position of the top portion; and at least one releasable fastener for releasably retaining the top portion in the second position.

20. The method of claim 19, wherein the top portion can be closed by folding over sections of the portion to encapsulate the bowling ball in the interior region of the bowling ball enclosure.

* * * * *